(12) United States Patent
Aldayeh et al.

(10) Patent No.: US 11,506,631 B2
(45) Date of Patent: Nov. 22, 2022

(54) GAS AND PARTICLE SENSOR USING VOLTAGE AND CURRENT BEHAVIOR BETWEEN ELECTRODES

(71) Applicant: Southwest Research Institute, San Antonio, TX (US)

(72) Inventors: Maher Abdulhamid Aldayeh, Helotes, TX (US); Imad Said Abdul-Khalek, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 419 days.

(21) Appl. No.: 16/733,574

(22) Filed: Jan. 3, 2020

(65) Prior Publication Data

US 2021/0208101 A1 Jul. 8, 2021

(51) Int. Cl.
*G01N 27/70* (2006.01)
(52) U.S. Cl.
CPC .................. *G01N 27/70* (2013.01)
(58) Field of Classification Search
CPC ........ G01N 27/62; G01N 27/68; G01N 27/70; G01N 27/92
USPC ................................. 324/464–470
See application file for complete search history.

(56) References Cited

U.S. PATENT DOCUMENTS

| | | | | |
|---|---|---|---|---|
| 5,475,311 A * | 12/1995 | Cho | ....................... | G01N 27/70 |
| | | | | 324/464 |
| 8,736,284 B2 * | 5/2014 | Aoki | .................. | G01N 15/0606 |
| | | | | 324/464 |
| 2006/0251543 A1 * | 11/2006 | Koratkar | ................ | G01N 30/64 |
| | | | | 422/98 |
| 2013/0000280 A1 * | 1/2013 | Korenev | ............ | G01N 15/0656 |
| | | | | 73/23.31 |
| 2017/0146480 A1 * | 5/2017 | Matsuda | ............ | G01N 27/4074 |
| 2020/0343074 A1 * | 10/2020 | Alizadeh | ................ | G01N 21/67 |

* cited by examiner

*Primary Examiner* — Judy Nguyen
*Assistant Examiner* — Rahul Maini
(74) *Attorney, Agent, or Firm* — Livingston Law Firm

(57) ABSTRACT

A sensor for detecting properties of a gas, gas mixture, or a gas or gas mixture containing particles, all collectively referred to as a "gas". A flow tube contains a pair of electrodes arranged such that at least a portion of the gas flows between the electrodes. A controller applies voltage to the electrodes and measures response data from the electrodes representing the voltage-current relationship and voltage breakdown between the electrodes while the gas is between the electrodes. Based on the response data, the controller determine a concentration of the gas or a concentration of particles within the gas.

16 Claims, 5 Drawing Sheets

GAS AND PARTICLE SENSOR USING VOLTAGE AND CURRENT BEHAVIOR BETWEEN ELECTRODES

TECHNICAL FIELD OF THE INVENTION

This invention relates to sensors for gasses and gas mixtures and particles in gasses or mixtures, and more particularly to such sensors using electrical characteristics between two electrodes.

BACKGROUND OF THE INVENTION

Paschen's law is an equation that gives the breakdown voltage, that is, the voltage necessary to start a discharge or electric arc, between two electrodes in a gas as a function of pressure and gap length. With a constant gap length, the voltage necessary to arc across the gap decreases as pressure is increased and then increases gradually, exceeding its original value. With constant pressure, the voltage needed to cause an arc decreases as the gap size is reduced but only to a point. As the gap is reduced further, micro-scale physical laws dominate and micro-discharges due to field emission phenomena become an important factor.

For a given gas, the voltage between electrodes is a function of the product of the pressure and the gap distance. The curve of voltage versus the pressure-gap product is called Paschen's curve. Paschen's law is the equation that fits these curves.

At higher pressures and gap lengths, the breakdown voltage is approximately proportional to the product of pressure and gap length. However, this is only roughly true, over a limited range of the curve.

Various gas and particle sensors have been developed that make use of Paschen's law.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to sensing gases and particles and their mixtures. The sensing has application to gases, gas mixtures, and to gases or gas mixtures containing particles, which may be all collectively referred herein to as a "gas" or "gases".

The sensing is performed by exploiting the voltage breakdown and voltage and current behavior between two electrodes. The presence of a gas or gas mixture (with or without particles) results in a response signal that indicates gas type(s), gas concentration(s), and particle concentration if particles are present.

The sensor has many applications and is especially suitable for installation in a vehicle to sense the properties of engine exhaust. The sensor is robust and accurate. It can be made as small as a conventional spark plug, meeting size requirements for current and future vehicles using internal combustion engines and onboard diagnostics.

Gas/Particle Sensor

Figure 1:
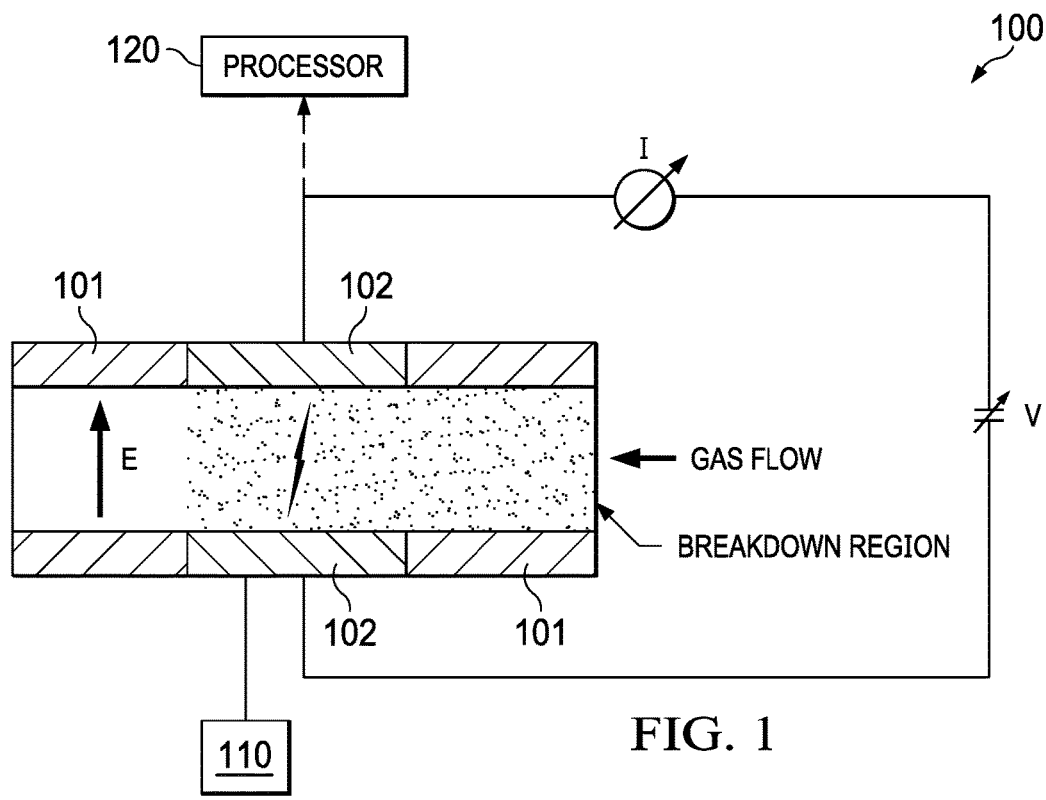
FIG. 1 illustrates the sensor of the invention schematically and illustrates its principle of operation.

FIG. 1 schematically illustrates a gas/particle sensor 100 in accordance with the invention. A gas of interest is flowing through a pipe, tube, or other structure 101. For vehicle exhaust applications, the gas is flowing through an exhaust line.

In the example of FIG. 1, the gas contains particles. The flowing gas alters the dielectric properties of the medium between two electrodes 102 to which voltage is applied. Sensor 100 exploits voltage breakdown and voltage-current properties to infer information about the type, composition, and properties of the medium between the two electrodes 102. At certain voltages depending on the composition of the gas, a voltage breakdown region may occur between electrodes 102.

A motor 110 is mechanically connected to one of the electrodes 102 and is operable to move that electrode 102 toward or away from the other electrode. This allows the gap distance between electrodes to be varied. Changing the gap distance changes the electric field across the gap. Where E is the electric field, V is the applied voltage, and d is the gap distance: $E = V/d$.

The ability to change the gap distance is a feature of sensor 100 that accommodates different particle size applications. Larger particles may require a larger gap distance. It is expected that for various applications, sensor 100 may accommodate particles in a range of 5 nanometers to 500,000 nanometers in diameter.

A processor 120 comprises appropriate equipment to electrically activate electrodes 102 and to receive and measure response signals representing response current and voltage. As explained below, processor 120 also receives and processes measurements from temperature, flow, and pressure sensors (not shown).

As explained below, the unique signatures of the voltage breakdown and voltage-current relationships are functions of the particle concentration, gas type and concentration, flow rate, and ambient measurements such as temperature and humidity.

With regard to gas composition, different gases will exhibit different Paschen curves and voltage-current relationships. For example, in engine exhaust, the voltage breakdown and the voltage-current curves may exhibit different signatures for $CO_2$, $H_2O$, $O_2$, $N_2$ and other gases that are typically present in engine exhaust. While an important application of the sensor is for particle characterization in engine exhaust, the sensor can be used for gas species detection in any gas.

Figure 2:
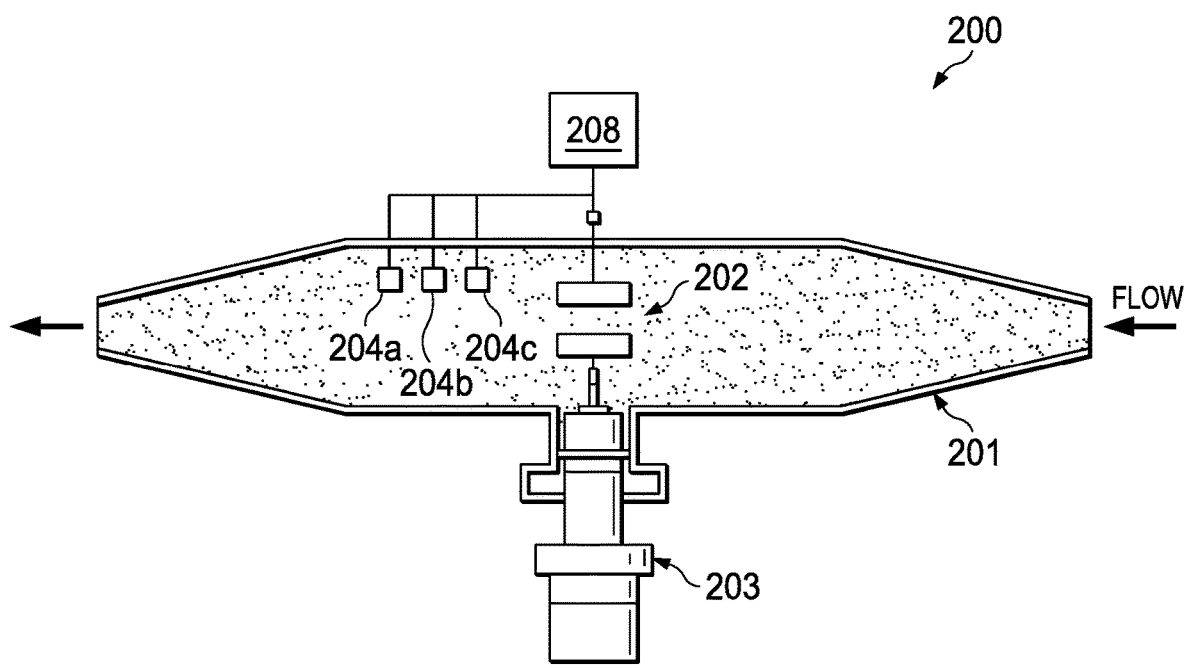
FIG. 2 illustrates one embodiment of the sensor of FIG. 1.

FIG. 2 illustrates one embodiment of gas/particle sensor 100, a gas/particle sensor 200. The sensor 200 is robust, with an expected temperature range of 20 degrees C. to +500 degrees C.

A flow tube 201 has a shape and size suitable for flow of gas within flow tube 201 from an inlet end to an outlet end. For automotive exhaust sensing applications, sensor 200 can be made very small, such as spark-plug size. For other applications, the size may vary depending on the application.

An example of a suitable material and geometry for flow tube 201 is an aluminum tube casing with funnel-like entry and exit openings. This conic design optimizes a consistent gas flow within the flow tube.

An example of suitable dimensions for flow tube 201 are a tube length of 10 centimeters and tube diameter of 2 centimeters. These dimensions define the overall physical size of sensor 200.

A pair of high voltage electrodes 202 are placed within flow tube 201, arranged so that at least a portion of the flow passes between them. These electrodes 202 form a microdischarge chamber within the flow tube 201. Depending on the application of sensor 200, an expected electrode size is an effective area diameter in the range of about 2 micrometers to 100 millimeters.

In the embodiment of FIG. 2, electrodes 202 are parallel-plate planar electrodes. However, in other embodiments, electrodes of various shapes could be used, such as pointed-to-planar or pointed electrodes.

In other embodiments, more than one pair of electrodes may be used in series. This configuration could be used to resolve particle type and concentration simultaneously for particular gases and gas mixtures.

Motor 203 is operable to change the distance between electrodes 201. An example of a suitable motor 203 is a motorized differential micrometer.

Sensors for measuring temperature, flow speed, and pressure within flow tube 201 are located in flow tube 201. These sensors are identified as sensors 204a, 204b, and 204c, respectively.

Controller 208 supplies an applied voltage to be applied to the electrodes 202. The applied voltage may be varied. A typical sensor 200 could have an applied voltage of up to 1 kV or higher depending on the electrode gap size chosen.

As stated above, controller 208 measures the current and voltage between electrodes 202. Other functions of controller 208 are to control motor 203 and to receive measurement data from sensors 204a, 204b, and 204c.

Controller 208 is assumed to have appropriate hardware and software for performing the methods and tasks described herein. Controller 208 may be implemented as a dedicated electronic circuit board.

In operation, a gas or gas mixture (which may or may not contain particles) enters sensor 200 through the inlet and exits via the outlet of flow tube 201, sweeping by the electrodes 202 inside the flow tube. A DC voltage is applied to the electrodes 202 as the gas is between them (still or flowing), and the voltage and current are measured. Control unit 208 processes measurement data from sensors 204a, 204b and 204c, as well as the voltage and current data (herein referred to as "response data") to obtain characteristics of the gas or gas mixture as explained below.

For a gas or gas mixture that contains particles, motor 203 can be actuated to change the gap distance. This maintains a desired particle size to gap distance ratio as described above.

As explained below, sensor 200 provides real time information of the gas-particle mixture content by exploiting the voltage breakdown (VB) and voltage-current (VI) properties in that medium. If particles are present, information about the size and composition can also be inferred.

Methods of Detecting Gas or Gas Mixture Properties (with or without Particles)

Voltage breakdown between electrodes 202 depends on the electron mean free path and the distance between the electrodes. The electron mean free path is the average distance the electrons travel before making a collision with gas atoms and is related to the pressure and the temperature.

If the distance between electrodes 202 and the temperature of the gas are fixed, the gas pressure may vary. At high pressure, the gas density is higher and the electron free mean path is very short. The electrons thus have very little time to accelerate and gain energy before losing it to collisions, leading to a high VB value at high pressures. In contrast, at low pressures, electrons are less likely to collide with gas atoms and they can indeed be accelerated to ionizing energies. However, at very low pressures, the probability of hitting gas atoms becomes very low and most of them hit the anode directly, setting severe limits on the avalanche process. In this case, the voltage breakdown threshold becomes very high.

Between the extremes of very high and very low pressures, there exists a region where the breakdown occurs as a function of the gas properties, pressure, the electrode material, and separation. This is known as the "Paschen's minimum." Different gases have different Paschen curves, and this knowledge can be used to detect what species of gas is present in the sensor.

The presence of particles in the gas can affect the breakdown threshold. This behavior is further affected by gap distance. For a particular gas, this knowledge can be used to determine the presence and concentration of particles in that gas.

Figure 3:
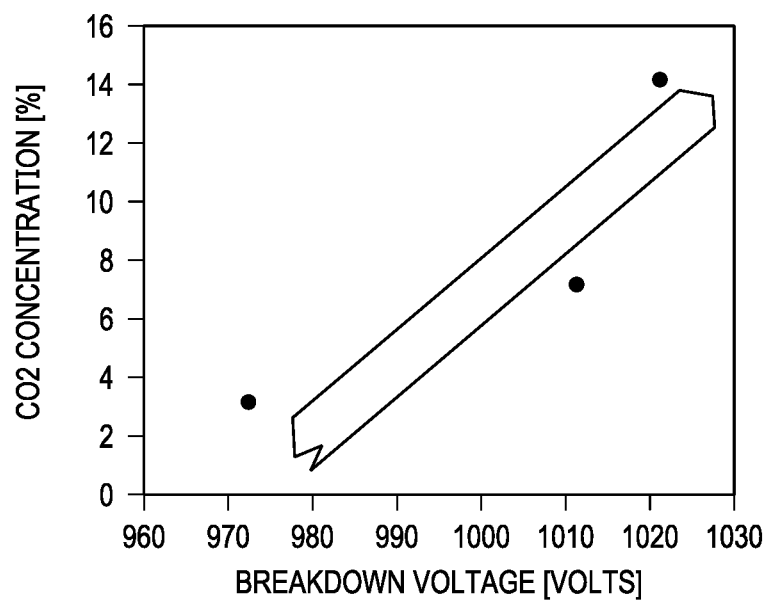
FIG. 3 illustrates how voltage breakdown values can be used to determine the type and concentration of a gas.

FIG. 3 is a plot of experimental data as an example of the voltage breakdown response of sensor 200 as a function of changing gas concentration. In the example of FIG. 3, the gas is CO2, but the same concept applies to other gases.

FIG. 3 illustrates how sensor 200 can be used to measure gas or particle concentrations from voltage breakdown values. Voltage breakdown changes as a function of the medium between the electrodes.

Referring again to FIGS. 1 and 2, changing the gap distance between electrodes would have a similar effect on the electric field as changing the applied voltage. In other words, the results of FIG. 3 can be obtained by either changing V or by changing d via motor 203. An advantage of changing d is the accommodation of differently sized particles. It is expected that the best results will occur if the ratio of mean particle size to the gap distance is in a range of about 1/100 to 1/1000 (or smaller) to avoid gap fouling.

Figure 4A:
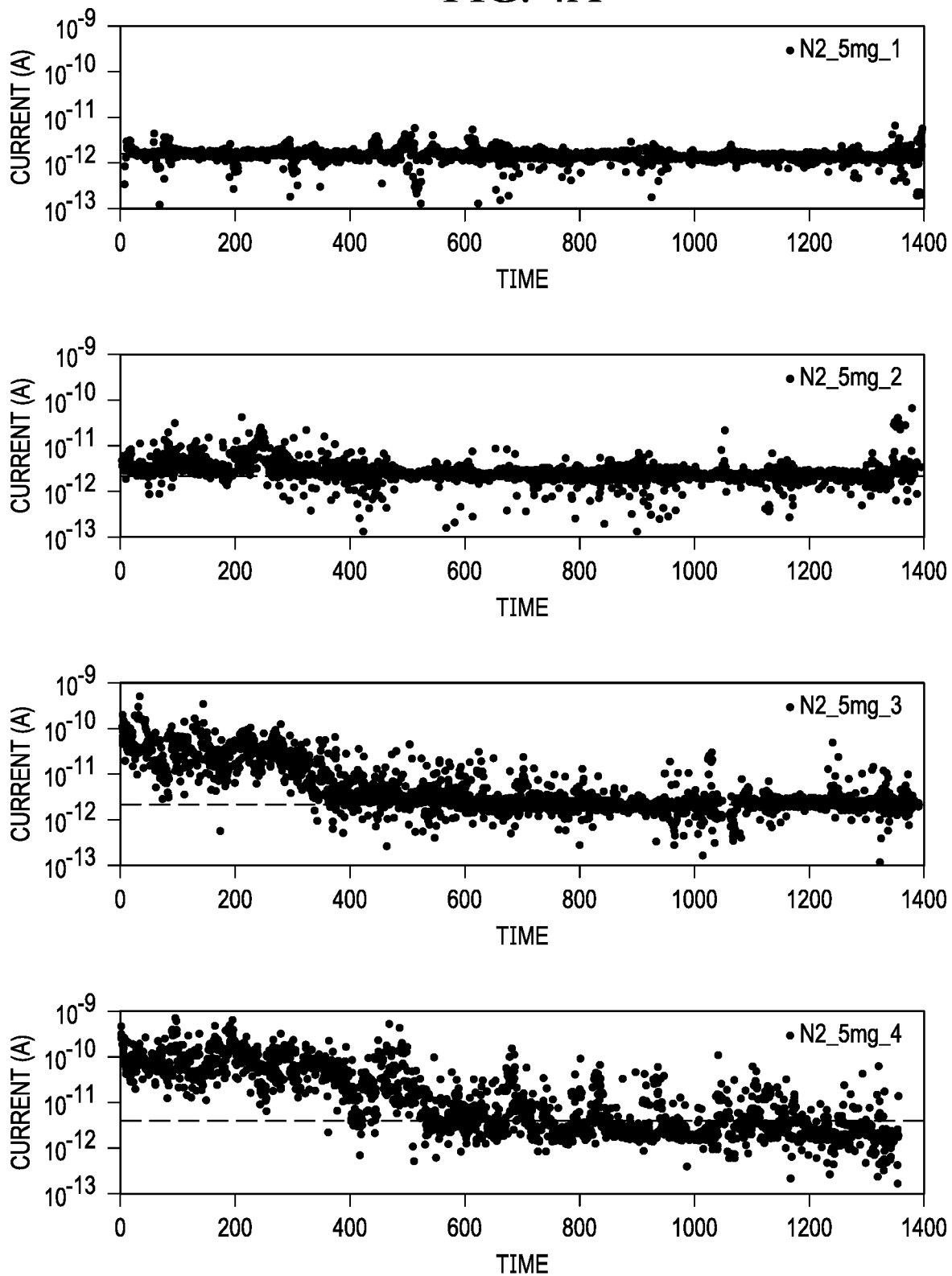
FIGS. 4A and 4B illustrate how the voltage-current relationship prior to voltage breakdown may be used to determine particle type and concentration in a gas.
Figure 4B:
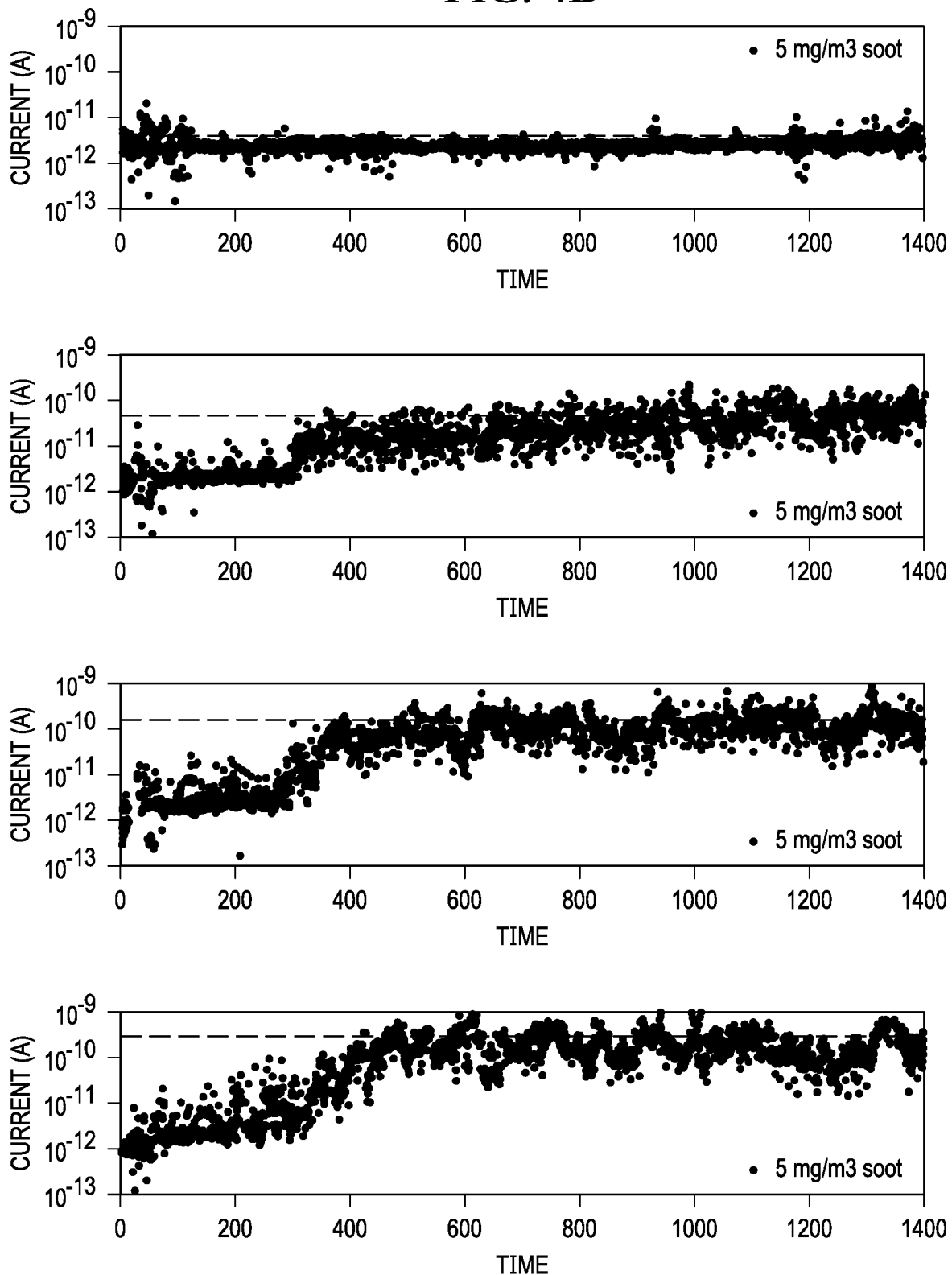

FIGS. 4A and 4B illustrate how sensor 200 may be used to measure current response as an indicator of gas or particle concentration. In the example of FIGS. 4A and 4B, the gas is exhaust gas and contains soot particles, but the same concept applies to other gases, gas mixtures, and particle-containing gases. In the range before voltage breakdown (VB), the voltage-current (VI) relationship changes as a function of both gas concentration and particle size.

FIGS. 4A and 4B plots experimental data, with alternating flows of nitrogen (N2) with no soot (FIG. 4A) and soot at 5 mg/m$^3$ (FIG. 4B) passed through electrodes 202. A voltage of 700 volts was applied to the electrodes 202, with a 70 micrometer gap between them.

The plots of FIG. 4A correspond to flows of nitrogen with no soot, and the plots of FIG. 4B correspond to flows with 5 mg/m$^3$ of soot. The plots of FIGS. 4A and 4B should be read as a series from left (FIG. 4A) to right (FIG. 4B) and downward in progression. At first (top plots), sensor 200 did not respond to the presence of soot, as it requires some surface seeding of soot particles before it provides a response and the particles starts jumping from one electrode to the next. After the first exposure with no response, sensor 200 was again exposed to nitrogen, then to soot again (second plots). With the second exposure, sensor 200 first read zero, then began to respond to soot concentration with a two order of magnitude increase in current. Then, sensor 200 was exposed to nitrogen again, took some time for the path to clear, then went down to zero with nitrogen FIG. $A, third plot). This process was repeated for four flows each of nitrogen and soot.

In practice, the effect of "early" or "late" response data, as soot collects, may be used to inform the condition of an exhaust aftertreatment device in a maintenance test. If sensor 200 is exposed to engine exhaust containing particles for a period of time, the exhaust aftertreatment device could either pass or fail particle emissions testing, depending on the sensor response.

FIGS. 4A and 4B further illustrate how particle size may be inferred. If flows through the electrodes 202 have two different size distributions, the mean diameter of the particles will be different. The time it takes for the flow to reach steady-state current infers the size distribution. For example, a mean diameter of one flow might take 5 minutes whereas a mean diameter of another flow might take 2 minutes to reach the same steady state current.

Transition Region to Voltage Breakdown

Figure 5:
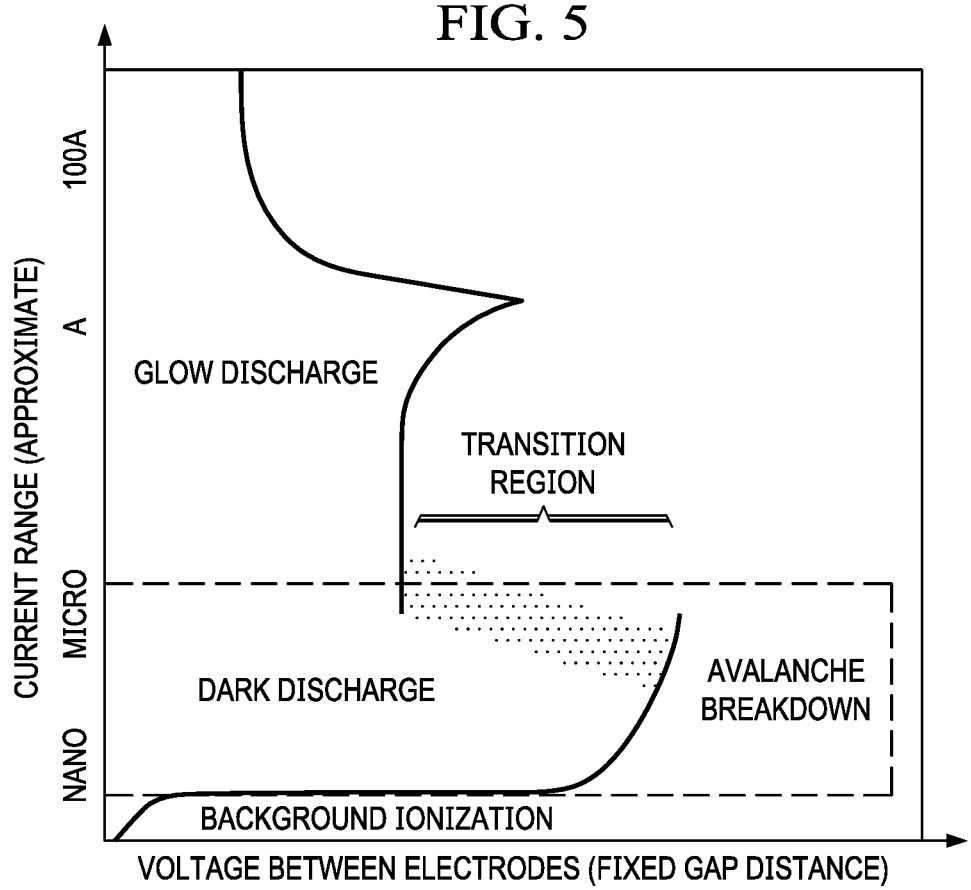
FIG. 5 illustrates a transition region to voltage breakdown which can be used to determine gas concentration and particle concentration.

FIG. 5 illustrates the voltage-current (VI) relationship between electrodes 202, with emphasis on the transition region to voltage breakdown (VB). It is assumed that the distance between electrodes is fixed, and FIG. 5 is for an arbitrary gas. The exact shape of the VI trace depends on a number of factors including the gas type, pressure, temperature, humidity, electrode geometry, material, surface roughness, size, etc.

At low voltages, the current between the electrodes is extremely small. As the voltage between the electrodes increases, the current increases slowly. This nano-amp scale current comes from the charge carriers produced by background ionization. These carriers are swept out of the gap by the electric field between the electrodes that is created by the applied voltage. Since the number of charge carriers created by the background radiation (cosmic radiation or other ionizing sources) is finite, the electric current quickly saturates. The voltage can then be increased with no increase in current. The ions and electrons are pulled towards the electrodes through the gas molecules interacting with them as they go. Further increase of the voltage facilitates the ionization process in the gas: electrons become more energetic and able to ionize gas molecules. At this point, the voltage-current characteristics begin tapering off near the breakdown voltage and the glow discharge becomes visible once the breakdown is reached.

Further increase of the voltage leads to a large electron density at the cathode, heating it to the point where electrons are emitted thermo-ionically. At this point, glow-to-arc transition occurs, and the process moves to thermal arcing, in which the plasma becomes mostly ionized. The earlier part of this VB process is also known as the cold breakdown, avalanche breakdown, or the Townsend discharge.

In the transition to VB, the VI profile to reaching breakdown is dependent on gas concentration. If the gas contains particles, the VI profile will depend on particle concentration. For exhaust gas applications, this trace is dependent on soot concentration. The signature of this transition profile can be used to detect these concentrations.

Vehicle Applications

Figure 6:
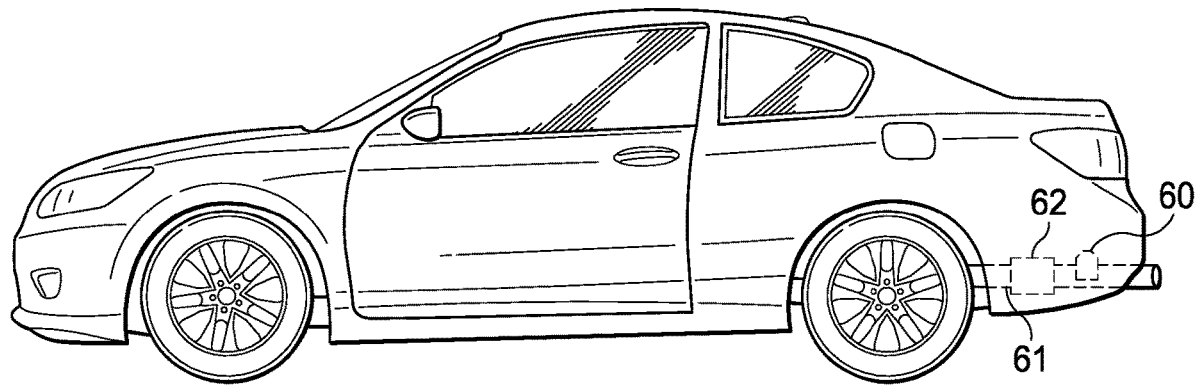
FIG. 6 illustrates a gas/particle sensor installed in a vehicle, used to test automotive emission.

FIG. 6 illustrates a gas/particle sensor 60 installed for use in testing emissions of a vehicle. The sensor 60 is installed within the tailpipe 61, downstream of an exhaust aftertreatment device 62.

Figure 7:
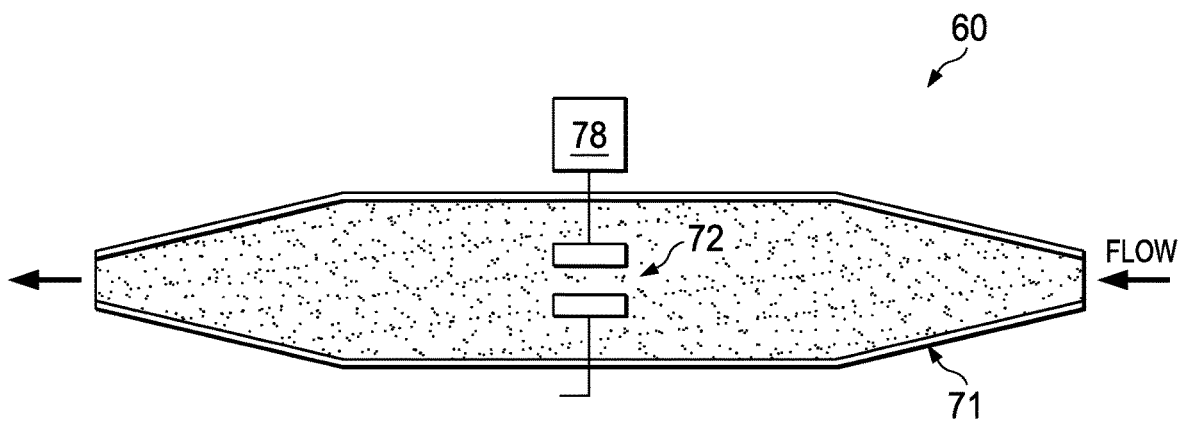
FIG. 7 illustrates the gas/particle sensor of FIG. 6 in further detail.

FIG. 7 illustrates sensor 60, which is similar to sensor 200, but its electrodes 72 need not be motorized. As explained above, the distance between electrodes 72 is fixed and has a gap distance that is optimized for the application, and in particular for the expected range of particle sizes. As with sensor 200, the electrodes are illustrated as parallel plate electrodes, but may have other configurations.

A controller 78 provides an applied voltage and receives response voltage data, via electrodes 72. It uses this data to determine V-I and voltage breakdown measurements for a flow of emissions passing through the electrodes.

In operation, sensor 60 is used to test the composition of the engine exhaust. As described above, gas species and concentrations, and particle concentrations can be determined. For example, controller 78 may store data of the V-I and/or VB characteristics of emissions from a properly functioning exhaust aftertreatment device, and compare this stored reference data to the current data. In this manner, the function of the exhaust aftertreatment device 62 can be tested.

What is claimed is:

1. A sensor for detecting properties of a gas, gas mixture, or a gas or gas mixture containing particles, all collectively referred to as a "gas", comprising:
    a flow tube;
    a pair of electrodes within the flow tube, arranged such that at least a portion of the gas flows between the electrodes; and
    a controller operable to apply voltage to the electrodes and to measure response data from the electrodes representing the current between the electrodes while the gas is between the electrodes;
    wherein the controller is further operable to process the response data to determine a concentration of particles within the gas based on a current response prior to voltage breakdown over time as particles collect within the flow tube.

2. The sensor of claim 1, further comprising a motor mechanically attached to one of the electrodes and operable to move the position of that electrode such that the distance between the electrodes may be varied.

3. The sensor of claim 1, further comprising at least one additional sensor within the flow tube for measuring one or more of the following properties of the gas: temperature, flow rate, and pressure.

4. The sensor of claim 1, wherein the controller is operable to process the response data to determine the concentration of at least one gas component of the gas based on the voltage breakdown of the gas.

5. The sensor of claim 1, wherein the controller processes the response data by comparing the response data to stored data representing a reference response.

6. The sensor of claim 1, wherein the distance between the electrodes is a fixed distance representing an optimal distance for determining the concentration of a selected range of particle sizes.

7. The sensor of claim 1, wherein the electrodes are parallel plate electrodes.

8. The sensor of claim 1, wherein the controller is operable to process the response data to determine the mean diameter of particles within the gas.

9. A method of detecting properties of a gas, gas mixture, or a gas or gas mixture containing particles, all collectively referred to as a "gas", comprising:

delivering the gas to a sensor comprising a flow tube, a pair of parallel plate electrodes within the flow tube, arranged such that at least a portion of the gas flows between the electrodes;

applying voltage to the electrodes;

varying the voltage applied to the electrodes;

measuring response data from the electrodes representing the current between the electrodes while the gas is between the electrodes;

processing the response data to determine a concentration of particles in the gas, based on a current response prior to voltage breakdown over time as particles collect within the flow tube.

10. The method of claim 9, wherein the step of varying the electric field is performed by varying the voltage applied to the electrodes.

11. The method of claim 9, wherein the step of varying the electric field between the electrodes is performed by varying the gap distance between the electrodes.

12. The method of claim 9, wherein the processing step is performed to determine the concentration of at least one gas component of the gas based on the voltage breakdown of the gas.

13. A vehicle emissions sensor for detecting properties of a gas, gas mixture, or a gas or gas mixture containing particles, all collectively referred to as a "gas", within the exhaust of a vehicle, comprising:

a flow tube;

a pair of electrodes within the flow tube, arranged such that at least a portion of the gas flows between the electrodes; and a controller operable to apply voltage to the electrodes and to measure response data from the electrodes representing the current between the electrodes while the gas is between the electrodes;

wherein the controller is further operable to process the response data to determine a concentration of particles within the gas, based on a current response prior to voltage breakdown over time as particles collect within the flow tube.

14. The sensor of claim 13, wherein the electrodes are a fixed distance apart, the distance being calculated to provide optimum response data for a selected range of particle sizes.

15. The sensor of claim 13, wherein the controller processes the response data by comparing the response data to stored data representing a reference response.

16. The sensor of claim 13, wherein the electrodes are parallel plate electrodes.

\* \* \* \* \*